T. TRIPP.
WATER-WHEEL.
No. 189,970. Patented April 24, 1877.
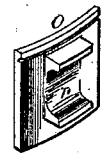
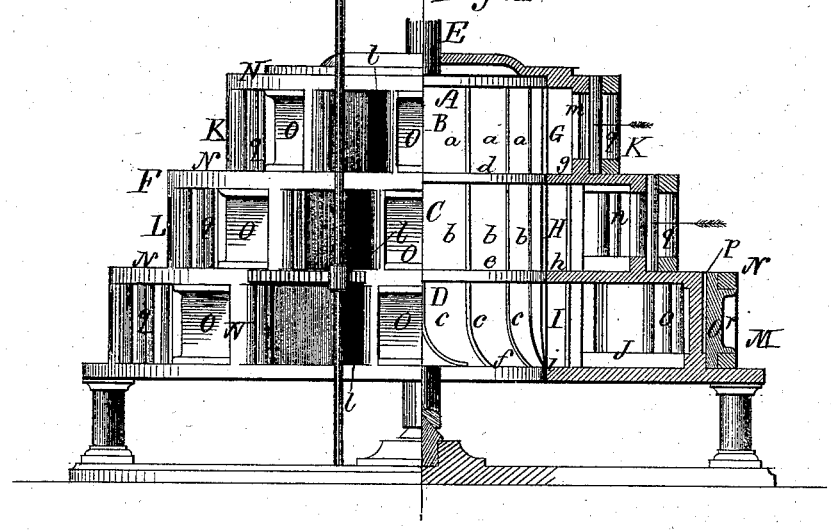
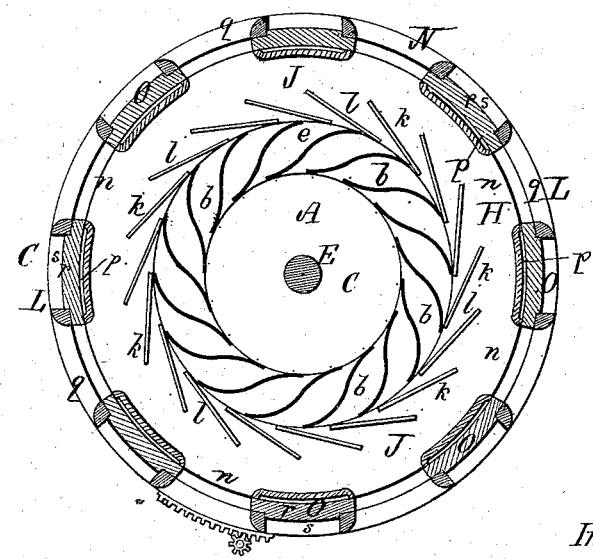
Witnesses.
Inventor:
Thomas Tripp.

UNITED STATES PATENT OFFICE.

THOMAS TRIPP, OF EAST STOUGHTON, MASSACHUSETTS.

IMPROVEMENT IN WATER-WHEELS.

Specification forming part of Letters Patent No. 189,970, dated April 24, 1877; application filed March 28, 1877.

*To all whom it may concern:*

Be it known that I, THOMAS TRIPP, of East Stoughton, Norfolk county, Massachusetts, have invented an Improvement in Water-Wheel, of which the following is a specification:

My present invention relates to improvements in the construction of the approaches of turbine water-wheels—that is to say, in the annular or register gates which govern the amount of water admitted to the wheel, and in the disposition of the chutes which impart a current or direction to the water as it is delivered upon the wheel.

I employ in my present wheel an annular or register gate, whole or in section, and in connection with such gate, and the corresponding openings in the wheel-case, a series of interposed independent pads, balanced, or practically balanced, to the outside pressure of water; and I provide between the outer termini of the chutes and the wheel case and gate a space for the reception of a large body of water, under its original head or pressure, in order to bring such water under such pressure as close as possible to the buckets of the wheel before directing it into the chutes, while the latter are as short as possible consistent with imparting proper direction to the water as it proceeds to the buckets of the wheel.

The recognized importance of offering no resistance to the water until it reaches the chutes leading to the wheel, and of advancing the water under its original head as close as possible to the wheel before entering the chutes, as well as relieving the gates from all possible friction, has given the impetus to my present invention.

The drawings accompanying this specification represent in Figure 1 a sectional elevation, and in Fig. 2 a horizontal section of a turbine water-wheel and its case, embracing my improvements, while Fig. 3 is a perspective view of one of the register-gate pads, to be explained.

I have represented in the accompanying drawings a wheel and case of several sets of buckets, and of water guideways and gates, in order that by closing one or more of such gates the water may act upon a smaller wheel surface, and vice versa, for my present improvement, though applicable to a wheel and case with a single set of buckets and approaches, is especially valuable to wheels of variable capacity.

In the said drawings, A represents a wheel of three sections, B C D, each section having its own buckets $a\ a$, $b\ b$, and $c\ c$, &c., with interposed annular plates or divisions $d\ e\ f$. The two upper series of buckets discharge centrally and downward through the interior of the wheel about its shaft E, while the lower buckets take and discharge the water outwardly and downwardly. I do not confine myself to such a construction of wheel, but prefer it for several reasons.

The wheel case or curb which surrounds the wheel, and contains the different sets of chutes, is shown at F, and though the extreme diameter of this case may vary with each set of chutes and wheel-buckets, I prefer it should be of substantially uniform diameter for certain conveniences in manufacture and operation.

The case F is divided horizontally into chambers G H I by a series of annular plates or shelves, $g\ h\ i$, coinciding with the divisions $d\ e\ f$ of the wheel A, and each chamber G H I contains a series of tangentially-arranged plates, $k\ k$, &c., which provide chutes $l\ l$, &c., to give direction to the water as it enters upon the wheel. The precise number or angle of these division-plates is not of present moment, the important feature of my invention with respect to these division-plates being that they stop short of the outer boundary of their respective chambers, as shown in Fig. 2 of the drawings, thus creating a space, J, for reception of water under its original head or pressure, to which no arbitrary direction or current has been given. The chutes $l\ l$ are as short as possible, consistent with giving proper direction to the water as it strikes the buckets of the wheel, while by increasing the extreme diameter of the wheel-case I not only provide the space J, before named, but enlarge the openings or sluices which admit water to the interior of such case, and in so doing afford a quantity of water fully adequate to supply the wheel.

The ports or sluices in the circumference of the case F for admitting water to the various chambers are shown at m m, &c., n n, &c., and o o, &c., while surrounding these respective ports, and encircling with a small intervening space, p, the three divisions of the case F, are annular or register gates K L M.

As each gate is of like construction and operation, a description of one will suffice for all. It is composed of a flat ring or annular frame, N, having ports or sluices q q created in it at regular intervals, and in such number and size as to coincide with the corresponding ports in the case F.

O O, &c., in the accompanying drawings, represent a series of "pads," (so called in water-wheel nomenclature,) each pad being a plate of a segment of a circle, struck from the center of the wheel, and being interposed between the ring-frame N and case F in the intermediate space p, which it loosely fills, each pad being retained in place and caused to move with the register gate-frame N by a stud or boss, r, which enters a corresponding opening, s, in the said frame N, and being of a size to cover and slightly overlap the surrounding edges of the adjacent water-inlet port of the case F.

It will be seen that the outer face of each section of the wheel-case F between the ports m, n, or o is of less diameter than the remainder, as shown at p in Fig. 2 of the drawings, the object of which is to permit access of water to both sides of the pad and balance it, as nearly as may be consistent with its remaining closed, to the pressure of the water.

It will be apparent that, as the only bearing between each pad O and the adjacent part of the wheel-case is that immediately surrounding the ports m n o of the latter, and as the water has access with equal pressure to both sides of the pad, that little friction remains to be overcome, the fact being that but pressure enough is exerted upon the pad to keep it closed. For this reason a governor may be used with my wheel to great advantage.

The gate and its pads may be removed and returned to place, if necessary, easily and quickly. But little machine-labor is required to fit them, and for this reason the wheel is economical.

Each gate is, or may be, opened and closed independently of the others, and for this reason any one section of the wheel may be used independently of the others.

Each gate is to be provided with a toothed rack and a pinion engaging such rack mounted upon a suitable shaft, by which means the gate is easily operated.

From the foregoing it will be seen that, as I reduce the length of chutes to the shortest practicable limit, I avoid all the friction of the water possible at this point, while, by increasing the area of the approaches outside of such chutes, I bring an ample supply of water, under its original head or pressure, to the nearest possible point to the wheel before giving it such direction as is absolutely necessary to properly act upon such wheel, and no more.

By balancing the port-closing pads, as stated, I avoid friction at this point, enable the gates to be operated easily and smoothly, and take no appreciable part of the power of the water to drive a governor.

Having thus explained the nature of my invention, and the manner in which the same is or may be carried into effect, I claim as my invention, and desire to secure by Letters Patent of the United States, the following:

1. In a register-gate for water-wheels, the independent balanced pads or valves O O, substantially as and for purposes stated.

2. The area or space J surrounding the chutes l l, substantially as and for purposes stated.

3. The combination, with a turbine-wheel and case of varying capacities, as stated, of the annular or register gate, with its balanced pads or valves, substantially as and for purposes stated.

4. The recessions p in the wheel-case, to permit access of water to the inner side of the pad O, substantially as and for purposes stated.

5. In a water-wheel case having two or more independent series of water-approaches, an independent annular or register gate to each series, substantially as and for purposes stated.

THOMAS TRIPP.

Witnesses:
F. CURTIS,
W. E. BOARDMAN.